United States Patent
Hasegawa et al.

(10) Patent No.: US 9,071,452 B2
(45) Date of Patent: Jun. 30, 2015

(54) HIGH-SPEED COMMUNICATION SYSTEM AND HIGH-SPEED COMMUNICATION METHOD

(75) Inventors: Yohei Hasegawa, Tokyo (JP); Masahiro Jibiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 54 days.

(21) Appl. No.: 13/579,508

(22) PCT Filed: Feb. 10, 2011

(86) PCT No.: PCT/JP2011/052859
§ 371 (c)(1),
(2), (4) Date: Aug. 16, 2012

(87) PCT Pub. No.: WO2011/102294
PCT Pub. Date: Aug. 25, 2011

(65) Prior Publication Data
US 2012/0314576 A1 Dec. 13, 2012

(30) Foreign Application Priority Data

Feb. 17, 2010 (JP) .................................. 2010-032872

(51) Int. Cl.
*H04L 12/24* (2006.01)
*H04L 12/26* (2006.01)
*H04L 29/06* (2006.01)
*H04L 12/721* (2013.01)

(52) U.S. Cl.
CPC ............ *H04L 12/2602* (2013.01); *H04L 43/00* (2013.01); *H04L 45/70* (2013.01); *H04L 69/02* (2013.01); *H04L 69/14* (2013.01)

(58) Field of Classification Search
None
See application file for complete search history.

(56) References Cited

U.S. PATENT DOCUMENTS

| 7,146,425 | B2 * | 12/2006 | Oottamakorn et al. | ........ 709/235 |
| 7,349,346 | B2 * | 3/2008 | Castelino | ........ 370/252 |
| 7,801,127 | B2 * | 9/2010 | Beeson et al. | ........ 370/389 |
| 2002/0114283 | A1 * | 8/2002 | Lee | ........ 370/252 |

(Continued)

FOREIGN PATENT DOCUMENTS

| CN | 1494296 A | 5/2004 |
| JP | 2008-199332 A | 8/2008 |

(Continued)

OTHER PUBLICATIONS

Maki, Ichinoshin, et al., "Performance Analysis and Evaluation of TCP Overlay Networks," IEICI Technical Report, Oct. 15, 2004, pp. 77-82, vol. 104, No. 340.

(Continued)

*Primary Examiner* — Chi H Pham
*Assistant Examiner* — Soon-Dong D Hyun
(74) *Attorney, Agent, or Firm* — Sughrue Mion, PLLC

(57) ABSTRACT

A high-speed communication system according to the present invention includes: a plurality of nodes disposed on a communication path; and a plurality of communication connections established between the plurality of nodes. The plurality of nodes exchange a plurality of pieces of performance model information between the nodes, the plurality of pieces of performance model information representing communication performances achievable by each of the plurality of communication connections. Each of the plurality of nodes executes communication control based on any one of the plurality of pieces of performance model information.

10 Claims, 6 Drawing Sheets

(56) References Cited

U.S. PATENT DOCUMENTS

2008/0192724 A1 8/2008 Kondo et al.
2010/0131670 A1 5/2010 Ishii et al.
2011/0010239 A1* 1/2011 Vijay et al. .................. 705/14.42

FOREIGN PATENT DOCUMENTS

| JP | 2009-152977 A | 7/2009 |
|---|---|---|
| KZ | 18880 B | 1/2010 |
| RU | 2378784 C2 | 1/2010 |
| WO | 2009/081576 A1 | 7/2009 |

OTHER PUBLICATIONS

Notice of Allowance, issued Nov. 6, 2013, issued by the Federal Service for Intellectual Property of the Russian Federation, in counterpart Application No. 2012134796.
Communication dated May 29, 2014, issued by the State Intellectual Property Office of the P.R. of China, in counterpart Application No. 201180009747.8.

* cited by examiner

HIGH-SPEED COMMUNICATION SYSTEM AND HIGH-SPEED COMMUNICATION METHOD

CROSS REFERENCE TO RELATED APPLICATIONS

This application is a National Stage of International Application No. PCT/JP2011/052859 filed on Feb. 10, 2011, which claims priority from Japanese Patent Application No. 2010-032872, filed on Feb. 17, 2010, the contents of all of which are incorporated herein by reference in their entirety.

TECHNICAL FIELD

The present invention relates to a high-speed communication system and a high-speed communication method in which data is transmitted through a plurality of nodes.

BACKGROUND ART

A TCP (transmission control protocol)/IP (internet protocol) communication scheme is a representative communication protocol used on the Internet. In the TCP/IP communication scheme, a transmitting terminal decides a communication rate to adapt to a communication speed at which communication is performed using a maximum transmittable data size within a range of a window size (information such as the number of data segments or a data size receivable by a receiving terminal) notified from a receiving terminal, and performs communication. It is known that a communication rate to be decided by a transmitting terminal decreases in inverse proportion to a network delay and a square root of a packet loss rate. In other words, in a network having a large delay or a network having a high packet loss rate, the TCP provides poor communication performance.

There is a communication scheme in which data is transferred to a device of a final destination such that data is sequentially transferred between terminals or nodes by using TCP communication as illustrated in FIG. 1. In the communication scheme in which each of a plurality of nodes on a network performs control of deciding a TCP communication rate, a network delay and packet loss are dispersed into network sections between nodes. For this reason, a network delay and packet loss in a TCP connection between nodes are reduced, and thus the communication performance by the TCP is improved. A related art intended to improve the performance of ratio communication is disclosed in Patent Document 1.

PRIOR ART DOCUMENT

Patent Document

[Patent Document 1] Japanese Unexamined Patent Application, First Publication No. 2008-199332

SUMMARY OF THE INVENTION

Problem to be Solved by the Invention

However, in this communication scheme, since each TCP connection operates independently, much data may be accumulated in a queue of a node that transfers data. A case in which a node transferring data transmits data, which is received from one network through a TCP connection A, to the other network through a TCP connection B will be described as an example. In this case, when the throughput of the TCP connection A is larger than the throughput of the TCP connection B, the amount of data accumulated in the queue of the node increases. When the amount of data accumulated in the queue of the node is about to reach an upper limit of a cumulative amount, the node performs a process of transmitting a notice representing that a receivable data size is to be limited to another node of a data transmission source using an advertise window of the TCP, and then temporarily suspending the communication. However, in this method, the control is performed only directly before the amount of data accumulated in the queue of the node reaches the upper limit of the cumulative amount, and thus it is impossible to prevent a large amount of data from being accumulated in the queue. Further, in the method of reducing the throughput of data from the transmission source using the advertise window, since it takes time to transmit the signal, performance is lowered due to a delay even when the communication resumes.

Similarly, there is a method of transmitting a signal for temporarily suspending communication such as a pause signal specified in IEEE802.1 to a node of a transmission source when the amount of data accumulated in a queue is likely exceeding an upper limit of the cumulative amount. However, when this method is performed in a line in which a delay exists, an extreme reduction in communication performance is caused by a delay between a time until communication is temporarily suspended and a time until communication resumes. For this reason, it is not usually used.

In the TCP communication, when a packet is lost in a network, retransmission of data is performed. When the retransmission of data is performed, the throughput may be lowered, and thus the queue of a node may increase.

In general TCP control, an increase speed of a communication rate is decided depending on a network delay. For this reason, in network sections having different delays from each other there arise differences in a communication rate, and thus there is a problem in that a lot of data is accumulated in the queue of the node.

An exemplary object of the present invention is to provide a high-speed communication system and a high-speed communication method, which are capable of reducing the amount of data accumulated in each of the queues of a plurality of nodes present in a communication path and improving the communication performance.

Means for Solving the Problem

In order to achieve the above object, a high-speed communication system of the present invention includes: a plurality of nodes disposed on a communication path; and a plurality of communication connections established between the plurality of nodes, the plurality of nodes exchanging a plurality of pieces of performance model information between the nodes, the plurality of pieces of performance model information representing communication performances achievable by each of the plurality of communication connections, and each of the plurality of nodes executing communication control based on any one of the plurality of pieces of performance model information.

In the high-speed communication system of the present invention, it is preferable that the plurality of nodes includes a start point node, an end point node, and a relay node disposed between the start point node and the end point node. The start point node may transmit to the end point node a control start signal announcing that communication is to be performed, the end point node that has detected the control start signal may calculate performance model information of the end point node based on detection of the control start signal, and the relay node may calculate performance model information of the relay node based on the detection of the control start signal. The start point node may transmit a performance model notice signal storing the performance model information to the end point node, and the relay node may compare the performance model information stored in the performance model notice signal with performance model information calculated by the relay node and may transfer the performance model notice signal storing the performance model information representing a smaller value when the relay node transfers the performance model communication signal to the end point node. Next, the end point node may store the performance model information stored in the received performance model notice signal, and may transmit a performance model decision signal storing the performance model information to the start point node, the relay node that has relayed the performance model decision signal to the start point node and the start point node may store the performance model information stored in the performance model decision signal, and the start point node and the relay node may perform TCP control based on the performance model information stored in the performance model decision signal.

A high-speed communication method of the present invention is used for a high-speed communication system performed via a plurality of nodes on a communication path including a start point node, an end point node, and a relay node disposed between the start point node and the end point node. This high-speed communication method includes: transmitting to the end point node a control start signal announcing that communication is to be performed, by the start point node; calculating performance model information of the end point node based on detection of the control start signal, by the end point node that has detected the control start signal; calculating performance model information of the end point node based on the detection of the control start signal, by the relay node; transmitting a performance model notice signal storing the performance model information to the end point node, by the start point node; comparing the performance model information stored in the performance model notice signal with performance model information calculated by the relay node and transferring the performance model notice signal storing only the performance model information representing a smaller value when the relay node transfers the performance model communication signal to the end point node; storing the performance model information stored in the received performance model notice signal and transmitting a performance model decision signal storing the performance model information to the start point node, by the end point node; storing the performance model information stored in the performance model decision signal, in the relay node that has relayed the performance model decision signal to the start point node and in the start point node; and performing TCP control based on the performance model information stored in the performance model decision signal, by the start point node and the relay node.

Effect of the Invention

According to an aspect of the present invention, communication is performed without increasing the amount of data accumulated in the queue of the node through the above-described process, and thus communication can be performed at a high speed.

Further, according to the aspect of the present invention, TCP connections before and after a node are different in speed from each other, and thus, since an increase in the amount of data accumulated in the node can be reduced, communication can be performed at a high speed.

Further, according to the aspect of the present invention, control is performed such that the degree of increase and decrease of the communication rate is made to the same at before and after a node, and thus, since an increase in the amount of data accumulated in the node can be reduced, communication can be performed at a high speed.

Further, according to the aspect of the present invention, even when communication is suspended using a control signal, communication resumption is not delayed due to a transmission delay when communication resumes. Accordingly, a reduction in communication performance can be prevented.

EMBODIMENTS FOR CARRYING OUT THE INVENTION

Hereinafter, a high-speed communication system according to a first exemplary embodiment of the present invention will be described with reference to the drawings.

Figure 1:
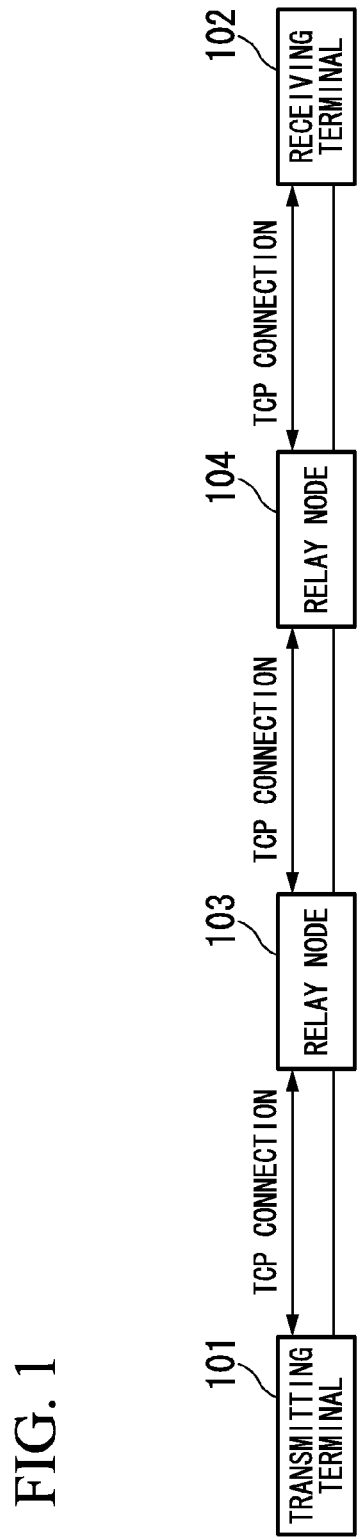
FIG. 1 is a block diagram illustrating a configuration of a high-speed communication system according to a first exemplary embodiment of the present invention.

FIG. 1 is a block diagram illustrating a configuration of a high-speed communication system according to a first exemplary embodiment.

The high-speed communication system (high-speed communication device) illustrated in FIG. 1 is constituted from a transmitting terminal 101, a receiving terminal 102, and relay nodes 103 and 104. FIG. 1 illustrates an example in which the transmitting terminal 101 communicates with the receiving terminal 102. Data transmitted from the transmitting terminal 101 is transmitted to the relay node 103. The relay node 103 transmits the data to the relay node 104. The relay node 104 transmits the data to the receiving terminal 102. At this time, data is transmitted between a terminal and a node that are adjacent to each other, or between adjacent nodes by a TCP connection.

At the time of data communication, when transmitting data to the node 103 at the downstream of the data communication, the transmitting terminal 101 notifies it of an achievable average throughput B. The node 103 compares the average throughput B received from the transmitting terminal 101 with the average throughput B achievable by its own node, and then transmits the smaller throughput B to the relay node 104 at the downstream of the data communication. The relay node 104 similarly compares the average throughput B received from the relay node 103 with the average throughput B of its own node, and then transmits the smaller throughput B to the receiving terminal 102 at the downstream of the data communication. Through this process, the receiving terminal 102 can be aware of the smallest average throughput B in TCP data communications of sections reaching the receiving terminal 102 from the transmitting terminal 101.

Further, similarly, when transmitting data to the node 103 at the downstream of the data communication, the transmitting terminal 101 notifies it of an increase speed ΔC of the throughput in its own terminal. The node 103 compares the increase speed ΔC received from the transmitting terminal 101 with the increase speed ΔC of the throughput in its own node, and then transmits the smaller increase speed ΔC to the relay node 104 at the downstream of the data communication. The relay node 104 similarly compares the increase speed ΔC of the throughput received from the relay node 103 with the increase speed ΔC of the throughput in its own node, and then transmits the smaller increase speed ΔC to the receiving terminal 102 at the downstream of the data communication. Through this process, the receiving terminal 102 can be aware of the smallest increase speed ΔC of the throughput in TCP data communications of sections reaching the receiving terminal 102 from the transmitting terminal 101.

The receiving terminal 102 transmits information of the average throughput B and the increase speed ΔC of the throughput received from the relay node 104 to the relay node 104. The relay node 104 transmits the information of the average throughput B and the increase speed ΔC of the throughput to the relay node 103. The relay node 103 transmits the information of the average throughput B and the increase speed ΔC of the throughput to the transmitting terminal 101. Through this process, each node and each terminal present on the communication path of data communication can detect information of the smallest average throughput B and the smallest increase speed ΔC of the throughput in the communication path. Each node and each terminal present on the communication path of data communication perform communication control using the average throughput B (the smallest average throughput in the communication path) and the increase speed ΔC of the throughput transmitted from the final destination of data communication.

In a general communication technique, notification of a line speed available in the case of connecting a communication line, that is, a maximum throughput, has been performed.

On the other hand, in the exemplary embodiment of the present invention, a network is divided into a plurality of TCP sections, and each of the transmitting terminal, the receiving terminal, and the relay node estimates the average throughput B achievable in each TCP section according to a network quality status and exchanges the information. Through this process, the throughput which can actually be used in the communication path can be known, and control is performed using the information such that a great amount of data is not accumulated in a queue in each terminal and node. Further, according to the exemplary embodiment of the present invention, in addition to the average throughput B estimated in each TCP section as described above, the increase speed ΔC of the throughput is exchanged by each terminal and each relay node, and communication control is performed using the information.

The TCP is a protocol of dynamically adapting the throughput according to a congestion status of a network. The increase speed ΔC of the throughput refers to a throughput increase speed per unit time.

In TCP RENO, which is a TCP derivative technique, basically, the throughput increases by one packet in a time (round trip time (RTT)) during which a packet makes a round trip between terminals or between a terminal and a node. For this reason, the throughput increase speed ΔC per unit time can be calculated by the following formula:

ΔC=PacketSize/RTT

In CUBIC TCP, which is another TCP derivative technique, the throughput is decided according to a packet loss rate regardless of the RTT. Thus, even in TCPs of different derivative techniques, by obtaining the throughput increase speed per unit time, exchanging it between terminals and nodes, and causing each node to operate in view of the smallest average throughput and the smallest throughput increase speed, the speed at which data is accumulated in a queue can be adjusted. As a result, the amount of data accumulated in the queue can be reduced.

Further, in the exemplary embodiment of the present invention, in addition to the above process, information of a time taken to retransmit a packet when a packet is lost in a network, a decrease width when the throughput is decreased, and the amount of data accumulated in a queue in each of a terminal and a node is exchanged between nodes and between a terminal and a node. For example, the node 104 detects the occurrence of packet loss in a TCP connection from the relay node 104 to the receiving terminal 102. In this case, the node 104 transmits a control signal S used to notify the neighboring relay node 103 at a preceding stage of the occurrence of packet loss. Upon receiving the control signal S, the relay node 103 is on standby for packet transmission for a "time taken for the node 104 to retransmit a packet to the receiving terminal 102" included in the control signal S, and thereafter resumes communication at the same throughput as the "throughput at the time of communication resumption" included in the control signal S. Through this process, the amount of data accumulated in the queue of the relay node 103 can be reduced, and it is possible to continue communication without unnecessarily suspending data transmission of the node 104.

In the exemplary embodiment of the present invention, control is performed such that no more data than necessary, but still a sufficient amount of data is accumulated in a queue of each node in view of exchanged information of a communication performance model (the throughput B, the increase speed ΔC of the throughput, or the like) and the amount of data present in the queue.

Figure 2:
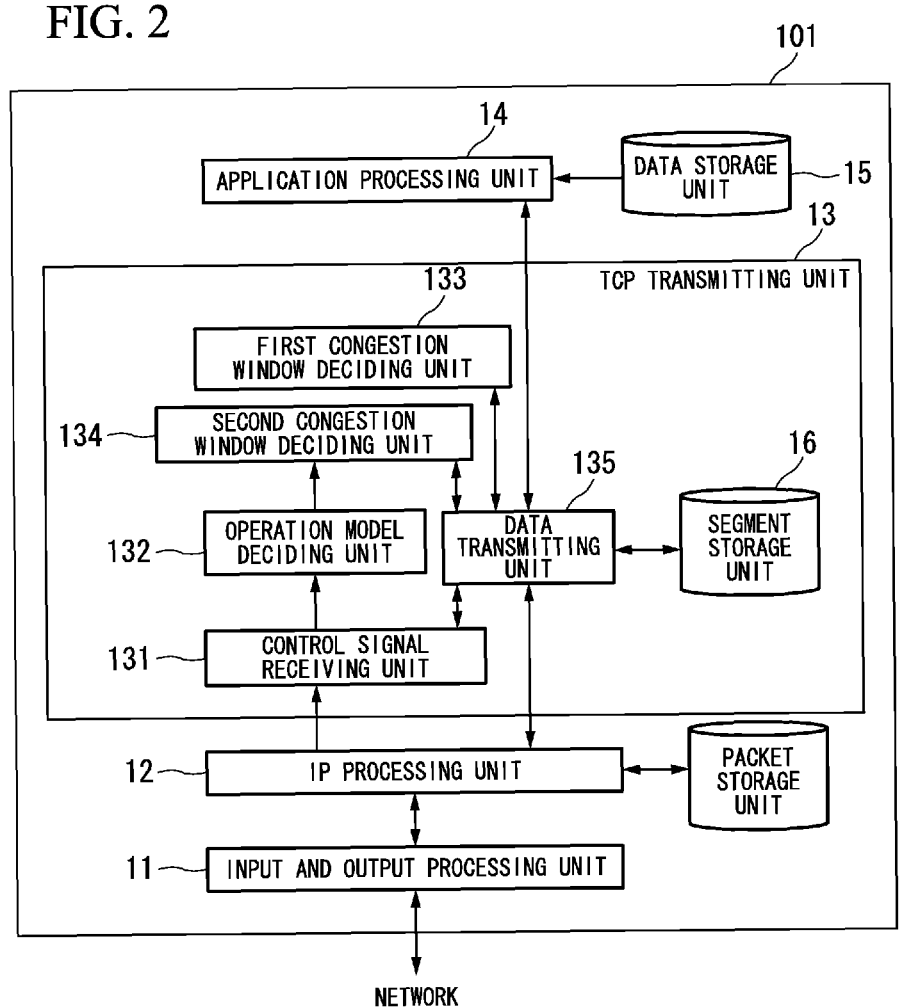
FIG. 2 is a diagram illustrating functional blocks of a transmitting terminal illustrated in FIG. 1.

FIG. 2 is a diagram illustrating functional blocks of a transmitting terminal.

As illustrated in FIG. 2, the transmitting terminal 101 includes an input and output processing unit 11, an IP processing unit 12, a TCP transmitting unit 13, and an application processing unit 14.

The input and output processing unit 11 transfers a packet received from a network to the IP processing unit 12, and transmits a packet transferred from the IP processing unit 12 to the network. The IP processing unit 12 determines a destination of a packet input from the Input and output processing unit 11, sends it to the TCP transmitting unit 13, packetizes a TCP segment transferred from the TCP transmitting unit 13, and transfers it to the input and output processing unit 11. The TCP transmitting unit 13 receives a control signal from a communication partner, decides a TCP processing method according to it, executes TCP processing on data transferred from an application to generate a TCP segment, and transfers it to the IP processing unit 12. The application processing unit 14 reads data from the data storage unit 15, and transfers it to the TCP transmitting unit 13.

The TCP transmitting unit 13 includes a control signal receiving unit 131, an operation model deciding unit 132, a first congestion window deciding unit 133, a second congestion window deciding unit 134, and a data transmitting unit 135.

The control signal receiving unit 131 receives a control signal from a communication partner, and transfers it to the operation model deciding unit 132. The operation model deciding unit 132 decides an operation method of the second congestion window deciding unit 134 based on the control signal, and notifies the second congestion window deciding unit 134 of the operation method. The first congestion window deciding unit 133 implements normal congestion window control by the TCP, and the second congestion window deciding unit 134 implements adjusted congestion window control according to the operation method instructed from the operation model deciding unit 132. The data transmitting unit 135 stores data transferred from the application processing unit 14 in a segment storage unit 16, decides transmission of data with reference to the congestion window of the first congestion window deciding unit 133 or the second congestion window deciding unit 134, generates a TCP segment, and transfers it to the IP processing unit 12.

Figure 3:
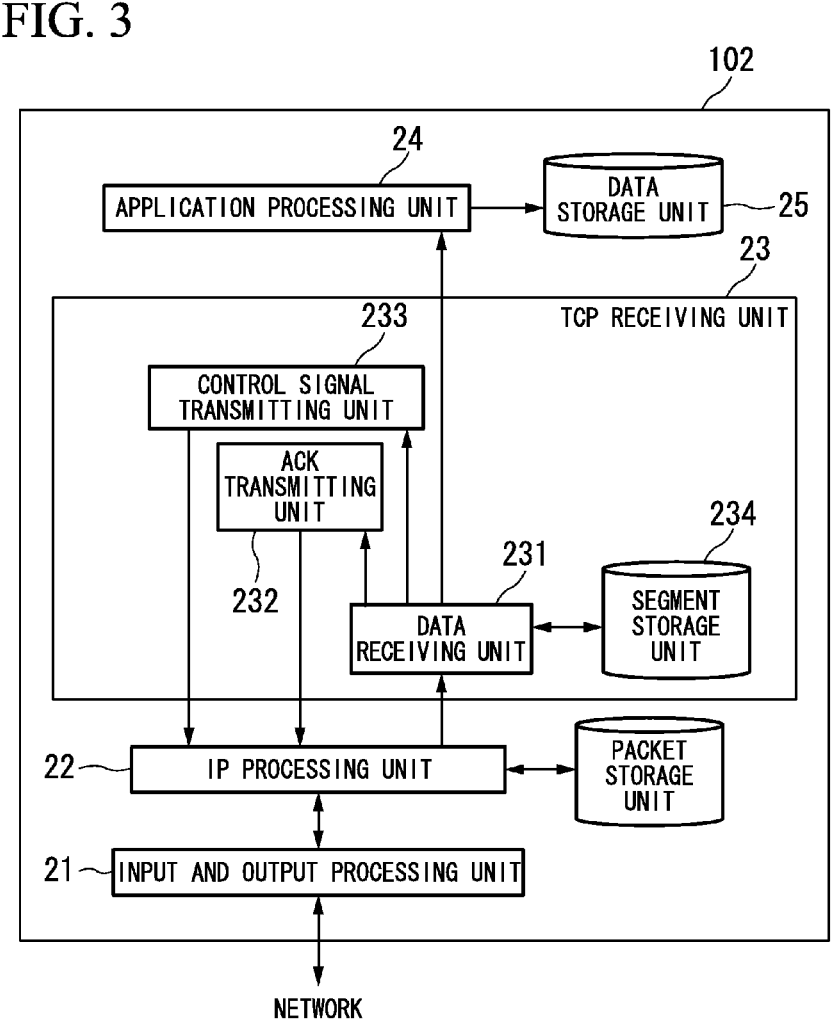
FIG. 3 is a diagram illustrating functional blocks of a receiving terminal illustrated in FIG. 1.

FIG. 3 is a diagram illustrating functional blocks of a receiving terminal.

As illustrated in FIG. 3, the receiving terminal 102 includes an input and output processing unit 21, an IP processing unit 22, a TCP receiving unit 23, and an application processing unit 24.

The input and output processing unit 21 receives a packet from a network, transfers it to the IP processing unit 22, and transmits a packet transferred from the IP processing unit 22 to the network. The IP processing unit 22 decides a destination of a packet input from the input and output processing unit 21, sends it to the TCP, packetizes an ACK transferred from the TCP receiving unit 23, and transfers it to the input and output processing unit 21. The TCP receiving unit 23 receives a packet from the IP processing unit 22, performs a TCP reception process, transfers the control signal to the IP processing unit 22 as necessary, and transfers data to the application processing unit. The application processing unit 24 receives data from the TCP receiving unit 23, and stores it in the data storage unit 25.

The TCP receiving unit 23 includes a data receiving unit 231, an ACK transmitting unit 232, and a control signal transmitting and receiving unit 233.

The data receiving unit 231 extracts a segment from a packet transferred from the IP processing unit 22, stores it in a segment storage unit 234, converts the segment into data (arranges or connects the segment) according to a request from an application, transfers the data, refers to the remaining capacity of a queue in the segment storage unit 234, and notifies the ACK transmitting unit 232 of it. The ACK transmitting unit 232 receives the notice from the data receiving unit 231, generates an ACK, and transfers it to the IP processing unit 22. The control signal transmitting and receiving unit 233 transmits or receives the control signal.

Figure 4:
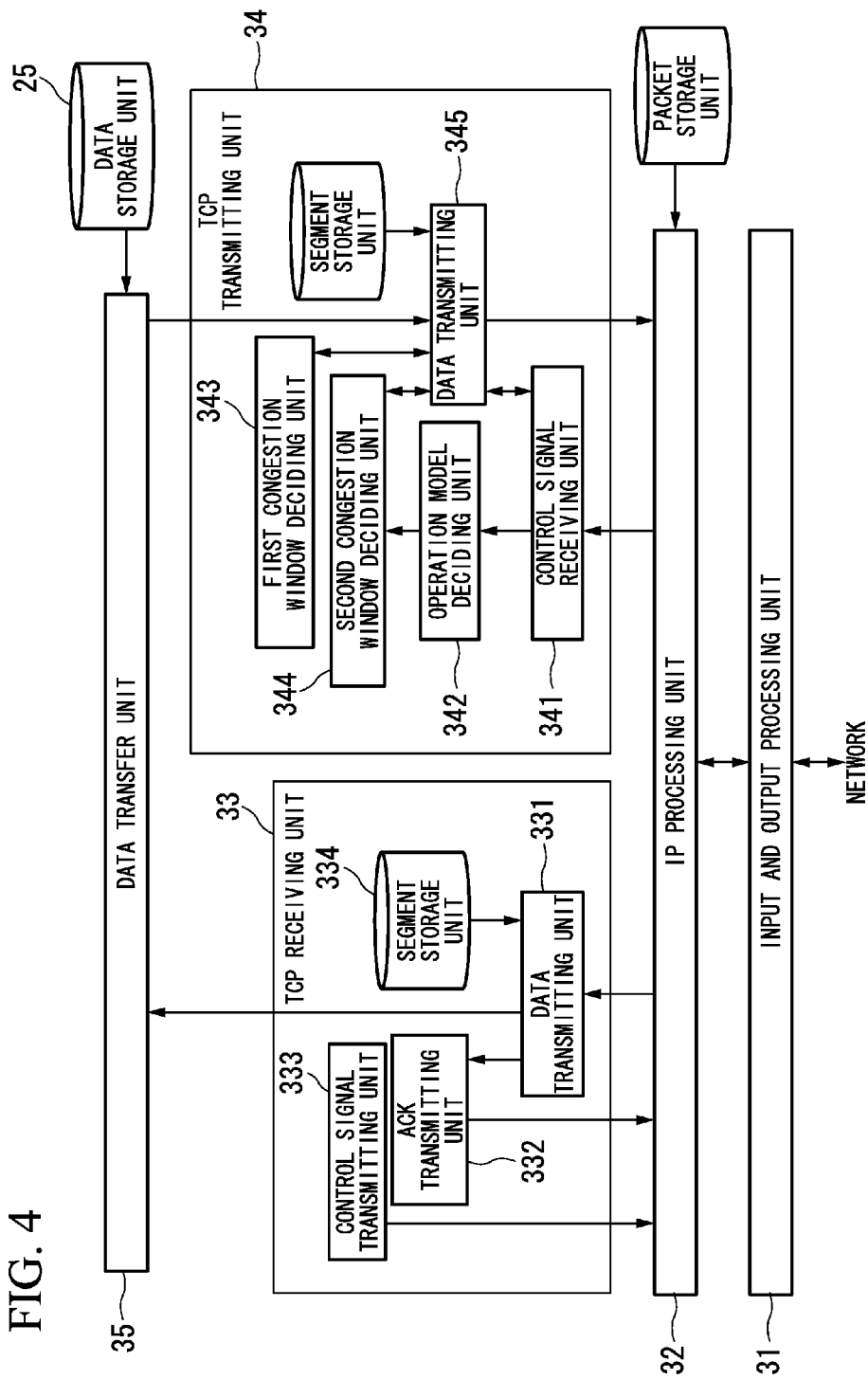
FIG. 4 is a diagram illustrating functional blocks of a relay node illustrated in FIG. 1.

FIG. 4 is a diagram illustrating functional blocks of a relay node.

The relay nodes 103 and 104 perform a TCP reception process on a received packet, and perform a process of converting it into data, transferring the data to a TCP transmitting unit 34 through a data transfer unit 35, and transmitting the packet.

There are described differences between the functions of the relay nodes 103 and 104 and the functions of the transmitting terminal 101 or the receiving terminal 102. The relay nodes 103 and 104 include an input and output processing unit 31, an IP processing unit 32, a TCP receiving unit 33, the TCP transmitting unit 34, and the data transfer unit 35. The input and output processing unit 31, the IP processing unit 32, the TCP receiving unit 33, and the TCP transmitting unit 34 perform the same processing as the corresponding processing unit of the transmitting terminal 101 or the receiving terminal 102 but are different in the following processing. That is, when packet loss occurs, a control signal transmitting and receiving unit 341 of the TCP transmitting unit 34 of the relay nodes 103 and 104 notifies a control signal transmitting and receiving unit 333 of the TCP receiving unit 33 of the occurrence of packet loss. Further, the control signal receiving unit 333 of the TCP receiving unit 33 performs a process of notifying the communication partner of the transmission source of the packet loss, the current amount of transmission standby data present in the TCP transmitting unit 34, and the throughput at the time of communication resumption.

Figure 5:
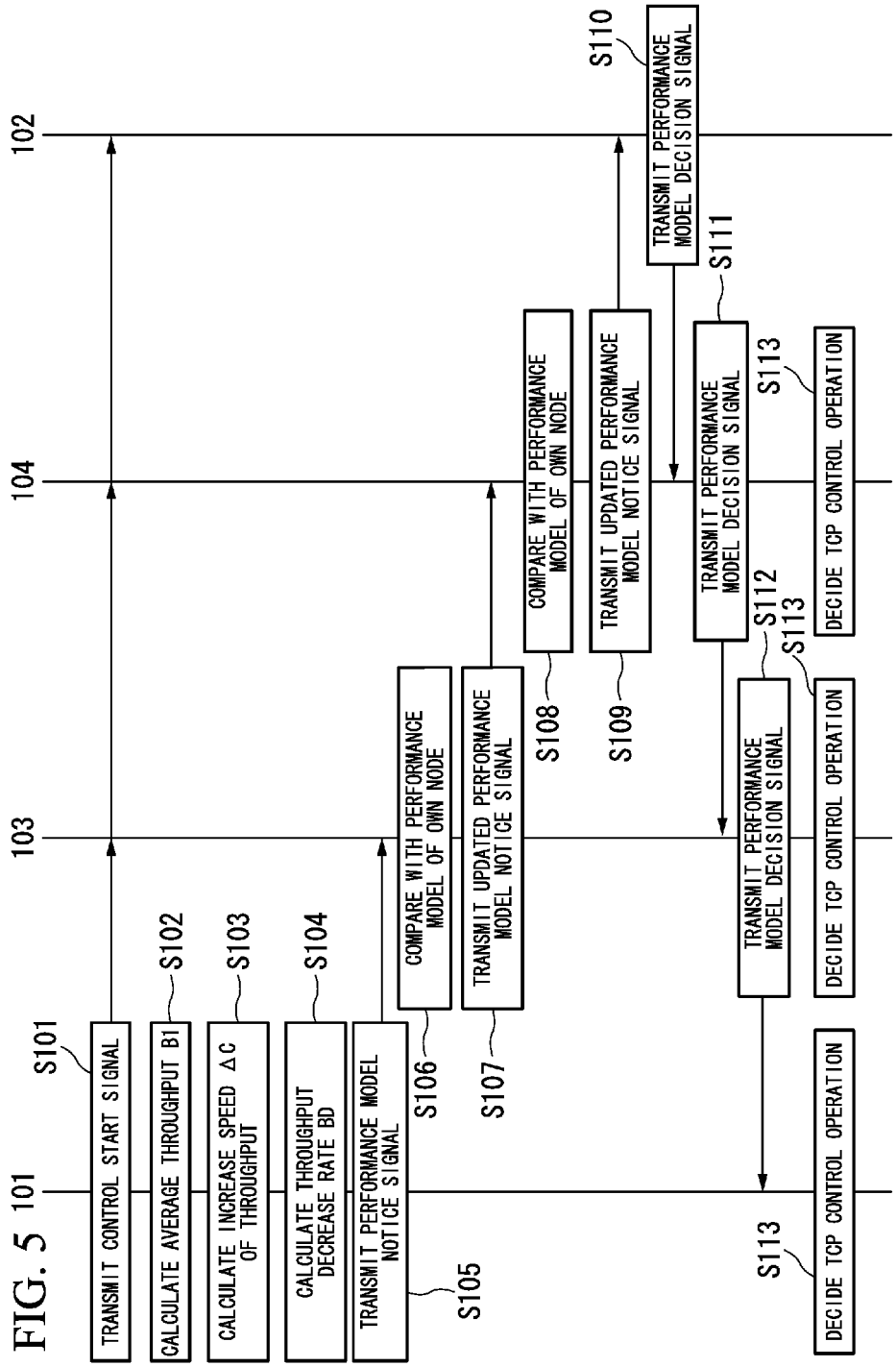
FIG. 5 is a diagram illustrating a process flow of the high-speed communication system according to the first exemplary embodiment of the present invention.

FIG. 5 illustrates a process flow of a high-speed communication system.

Next, the details of a process flow of a high-speed communication system according to the present exemplary embodiment will be described in order.

The description will proceed in connection with an example in which data communication is performed in the high-speed communication system of FIG. 1. Data transmitted from the transmitting terminal 101 is transferred to the relay node 103, the relay node 104, and the receiving terminal 102 in order.

First, the transmitting terminal 101 transmits a control start signal to the receiving terminal 102 (step S101). At this time, the control start signal is transmitted to the receiving terminal 102 via the relay nodes 103 and 104. Next, the transmitting terminal 101 that has transmitted the control start signal calculates an average throughput B1 achievable in the TCP connection between the transmitting terminal 101 and the relay node 103 (step S102). A process of calculating the average throughput B (B1) is performed according to Formula (1):

$$B_k \approx \min\left(\frac{W_k}{d_k}, \frac{C}{d_k \sqrt{p_k}}\right) \qquad \text{[Formula 1]}$$

In Formula (1), when "k" is "103" representing the relay node 103, "Wk" is a smaller value of a maximum congestion window size of the transmitting terminal 101 and a maximum reception window size of the relay node 103 which is a subsequent node. "d" is an RTT between the transmitting terminal 101 and the relay node 103 which is a subsequent node. "C" is a constant, and "p" is a packet loss rate. It is preferable that "d" and "p" are calculated based on a statistical value in advance, and are updated during communication as necessary.

The transmitting terminal 101 calculates the increase speed ΔC of the throughput as follows (step S103).

ΔC=PacketSize/$d$

"PacketSize" is a segment size. The transmitting terminal 101 obtains a time FRT (hereinafter referred to as a communication resumption estimated time) until packet retransmission communication resumes if it is supposed that packet loss occurs in its own terminal, as follows (step S103).

FRT=$d$ ($d$: RTT between transmitting terminal 101 and relay node 103)

The transmitting terminal 101 calculates a rate BD (hereinafter throughput decrease rate) to decrease the throughput from the throughput before the packet loss occurs when packet loss occurs and thus packet retransmission communication resumes, as follows (step 104).

BD=½

The relay node 103, the relay node 104, and the receiving terminal 102 which have received the control start signal transmitted from the transmitting terminal 101 in step S101 calculate the average throughput B in a TCP connection with a node or terminal of a transmission destination, the increase speed ΔC of the throughput in the TCP connection, the communication resumption estimated time FRT, and the throughput decrease rate BD, similar to the transmitting terminal 101.

Respective pieces of information calculated by the transmitting terminal 101 are expressed as an average throughput B1, an increase speed ΔC1 of the throughput, a communication resumption estimated time FRT1, and a throughput decrease rate BD1. Respective pieces of information calculated by the receiving terminal 102 are expressed as an average throughput B2, an increase speed ΔC2 of the throughput, a communication resumption estimated time FRT2, and a throughput decrease rate BD2. Respective pieces of information calculated by the relay node 103 are expressed as an average throughput B3, an increase speed ΔC3 of the throughput, a communication resumption estimated time FRT3, and a throughput decrease rate BD3. Respective pieces of information calculated by the relay node 104 are expressed as an average throughput B4, an increase speed ΔC4 of the throughput, a communication resumption estimated time FRT4, and a throughput decrease rate BD4.

Next, the transmitting terminal 101 generates a performance model notice signal storing the calculated average throughput B1, the increase speed ΔC1 of the throughput, the communication resumption estimated time FRT1, and the throughput decrease rate BD1, and transmits the performance model notice signal to the relay node 103 (step S105). Upon receiving the performance model notice signal, the relay node 103 compares the average throughput B1 stored in the performance model notice signal with the average throughput B3 calculated in its own node (step S106). Next, the relay node 103 updates the information stored in the performance model notice signal to the average throughput B representing the smaller value in the comparison, and the increase speed ΔC of the throughput, the communication resumption estimated time FRT, and the throughput decrease rate BD which are calculated by the device (either the transmitting terminal 101 or the relay node 103) that has calculated the average throughput B. Further, the relay node 103 transmits the updated performance model notice signal to the relay node 104 (step S107).

The relay node 104 also performs the same process. In other words, the relay node 104 acquires the average throughput 13 from the performance model notice signal received from the relay node 103, compares the average throughput B with the average throughput B4 of its own node (step S108), and selects the smaller average throughput B. Next, the relay node 104 updates the information stored in the performance model notice signal to the average throughput B representing the smaller value in the comparison, and the increase speed ΔC of the throughput, the communication resumption estimated time FRT, and the throughput decrease rate BD which are calculated by the device that has calculated the average throughput B. The relay node 103 transmits the updated performance model notice signal to the receiving terminal 102 (step S109). The receiving terminal 102 stores the average throughput B, the increase speed ΔC of the throughput, the communication resumption estimated time FRT, and the throughput decrease rate BD in the storage unit.

The receiving terminal 102 generates a performance model decision signal storing the average throughput B, the increase speed ΔC of the throughput, and the throughput decrease rate BD among pieces of information stored in the storage unit, and transmits it to the relay node 104 (step S110). The relay node 104 stores the average throughput B, the increase speed ΔC of the throughput, and the throughput decrease rate BD which are stored in the performance model decision signal in the storage unit, and transmits the performance model decision signal to the relay node 103 (step S111). Similarly, the relay node 103 stores the average throughput B, the increase speed ΔC of the throughput, and the throughput decrease rate BD which are stored in the performance model decision signal in the storage unit, and transmits the performance model decision signal to the transmitting terminal 101 (step S112). The transmitting terminal 101 stores the average throughput B, the increase speed ΔC of the throughput, and the throughput decrease rate BD which are stored in the performance model decision signal in the storage unit.

Next, the transmitting terminal 101 including the operation model deciding unit 132 in the TCP transmitting unit 13, and the relay node 103 and the relay node 104 including the operation model deciding unit 342 in the TCP transmitting unit 34 decide TCP control operation as follows based on information acquired from the performance model decision signal (hereinafter, pieces of information obtained from the performance model decision signal are referred to as an average throughput Bx, an increase speed ΔCx of the throughput, and a throughput decrease rate BDx) (step S113). First, the operation model deciding units (132 and 342) of the transmitting terminal 101 and the relay nodes 103 and 104 calculate the following items (a), (b), and (c).

(a) Maximum window size=Average throughput Bx×2
(b) Increase width of congestion window when one ACK packet is received=2×throughput increase speed ΔCx/d Here, "d" represents an RTT between a terminal and a node or an RTT between nodes.

(c) Decrease in congestion window at time of packet loss=Throughput decrease rate BDx Each of the first congestion window deciding unit (133, 343) implements normal TCP operations as follows for example.

The maximum window size=Arbitrarily set for each terminal.
The increase width of the congestion window when one ACK packet is received=Corresponding to one packet
The decrease in the congestion window at the time of packet loss=½

Examples of TCP control include TCP control of deciding an operation based on a determination of packet loss, TCP control of deciding an operation based on an increase in a delay, and TCP control considering both packet loss and a delay, and TCP control may be implemented by any operation. Each terminal or relay node performs TCP control based on a decided parameter.

Figure 6:
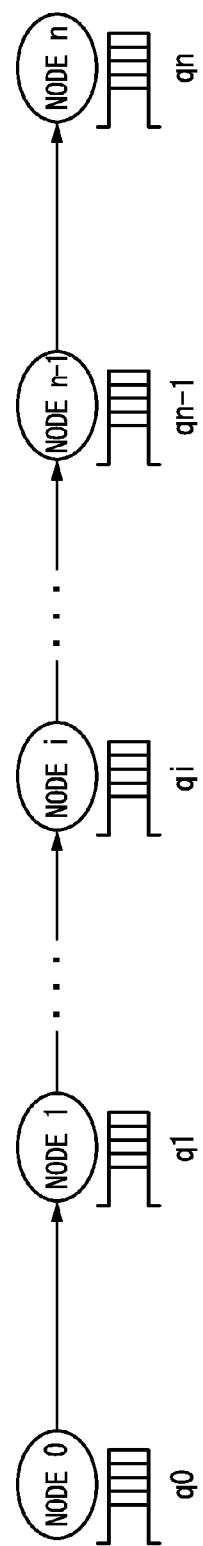
FIG. 6 is a diagram illustrating a status of a queue in each node according to the first exemplary embodiment of the present invention.

FIG. 6 is a diagram illustrating a status of a queue in each node.

Each of the relay nodes 103 and 104 and the receiving terminal 102 performs a TCP operation decided through the above-described process. Further, each of the relay nodes 103 and 104 and the receiving terminal 102 notifies an upstream node or an upstream terminal of a communication suppression determination signal according to the amount of transmission standby data accumulated in the queue of the TCP receiving units (23 and 33) as follows. Here, i=0, 1, 2, and 3. Regarding a node (i), a node (0) represents the transmitting terminal 101, a node (1) represents the relay node 103, a node (2) represents the relay node 104, and a node (3) represents the receiving terminal 102. Further, the queues q(i) of the nodes (i) are represented as q(0), q(1), q(2), and q(3).

At this time, a preceding node (i−1) and a subsequent node (i) arranged subsequent to the preceding node (i−1) are considered.

(A): case of q(i)<m×average throughput B(i)×FRT(i−1)

This is the case in which the amount of data accumulated in the queue q(i) of the subsequent node (i) is smaller than the amount of data of m times (m is a constant) the amount of data when communication is performed at the average throughput B(i−1) between the nodes during a time of an RTT between the preceding node (i−1) and the subsequent node (i). In this case, since there is room in data communication, the communication suppression determination signal representing a use of the first congestion window deciding unit (133 or 343) that performs normal congestion window control is transmitted from the subsequent node (i) to the preceding node (i−1).

(B): case of m×average throughput B(i)×FRT(i−1)≤q(i)≤X

This is the case in which the amount of data accumulated in the queue q(i) of the subsequent node (i) is equal to or larger than the amount of data of m times (m is a constant) the amount of data when communication is performed at the average throughput B(i) between the nodes during a time of an RTT between the preceding node (i−1) and the subsequent node (i) and smaller than a constant X which is an upper limit value representing communication suspension. In this case, since there is no room in data communication, the communication suppression determination signal representing a use of the second congestion window deciding unit (134 or 344) that performs control of reducing the congestion window is transmitted from the subsequent node (i) to the preceding node (i−1).

(C): case of X<q(i)

This is the case in which the amount of data accumulated in the queue q(i) of the subsequent node (i) is larger than the upper limit value X representing communication suspension. In this case, the communication suppression determination signal representing that data transmission is to be suspended during the FRT(i), that is, a time of an RTT between the subsequent node (i) and the next node (i+1), is transmitted from the subsequent node (i) to the preceding node (i−1). The constant m is set to a numerical value in a range of about 2 to 4, and the constant X is set to a numerical value in a range of about 5 to 10. Then, each node that has received the communication suppression determination signal performs communication control based on information represented by the communication suppression determination signal.

Moreover, each node or terminal detects the occurrence of packet loss. When the occurrence of packet loss is detected, the node (i) that has detected the packet loss transmits the control signal S as follows, and the node (i−1) that has received the control signal S operates as follows.

(D): When the node (i) that has detected the packet loss performs communication using the second congestion window deciding unit, the communication suppression determination signal representing that communication is to be suspended by the FRT(i), that is, a time of an RTT between the subsequent node (i) and the next node (i+1), is transmitted from the subsequent node (i) to the preceding node (i−1).

(E): The node (i−1) suspends communication by the time of the FRT(i) represented by the communication suppression determination signal. Then, after the FRT(i) elapses, the node (i−1) multiplies the congestion window by the throughput decrease rate BD, decides a new congestion window size, and resumes communication.

Through the above-described process, the high-speed communication system according to the present exemplary embodiment performs a process of changing a TCP control method according to the amount of data accumulated in the queue of the node.

A case will be described in which since a sufficiently large amount of transmission standby data remains accumulated in a node (i), the transmission standby data of the node (i) does not become 0 even when packet loss occurs in the node (i−1), and communication is suspended by the FRT(i−1), that is, a time of an RTT between the node (i) and the preceding node (i−1). In this case, the node (i−1) performs a TCP operation using the second congestion window deciding unit (134 or 344) that suppresses the throughput.

On the other hand, a case will be described in which since a sufficiently large amount of transmission standby data does not remain accumulated in the node (i), the transmission standby data of the node (i) is about to become 0 when packet loss occurs in the node (i−1), and communication is suspended by the FRT(i−1). In this case, the node (i−1) performs a TCP operation using the first congestion window deciding unit (133 or 343) that further increases the throughput.

Through this process, the amount of data accumulated in the queue of each node can be suppressed to be small.

For example, a case in which the TCP connection from the relay node 104 to the receiving terminal 102 is a bottleneck will be described. In this case, the relay node 104 performs the TCP operation using the first congestion window deciding unit (343). Further, another relay node or the transmitting terminal 101 performs control of providing substantially the same throughput as communication between the relay node 104 and the receiving terminal 101 by the TCP operation of the second congestion window deciding unit (134 or 344).

Also, for example, a case in which the TCP connection from the transmitting terminal 101 to the relay node 103 is a bottleneck will be described. In this case, the transmitting terminal 101 performs the TCP operation using the first congestion window deciding unit (133), and another node performs control of providing substantially the same throughput as communication between the transmitting terminal 101 and the relay node 103 by the TCP operation of the second congestion window deciding unit (344).

Next, a high-speed communication system according to a second exemplary embodiment will be described.

The high-speed communication system according to the second exemplary embodiment is an example of the case where in the configuration described in the first exemplary embodiment, the first congestion window deciding unit 343 of the relay node 103 performs different processing from processing described in the first exemplary embodiment.

Here, the relay node 103 is assumed to be the node i. The first congestion window deciding unit 133 of the node i is set as in (1) to (3) to satisfy conditions (I) and (II).

(I): The average throughput B(i) in the node (i)=The average throughput B(i+1) in the node (i+1)

(II): The throughput decrease rate BD(i) when the packet loss occurs in the node (i)=The throughput decrease rate BD(i+1) when the packet loss occurs in the node (i+1)

(1): Maximum window size=(Average throughput B(i+1)× d(i+1))×(d(i)/d(i+1))

(2): Increase width of congestion window when one ACK packet is received=2×increase speed ΔC of the throughput of node (i+1)/d(i+1)

Here, "d" represents an RTT between a node and a node subsequent to the node.

(3): Decrease value in congestion window in node (i) at time of packet loss=Throughput decrease rate BD(i+1) when packet loss occurs in node (i+1)

Through this setting, even when a delay in a communication path (i) from a node (i) to a node (i+1) is very large and a delay in a communication path (i+1) from a node (i+1) to a node (i+2) is small, communication in both of them can be performed at the same throughput in conjunction with each other.

This is effective when the communication path from the node 103 to the node 104 is a communication path that has no packet loss but has a very large delay such as a submarine cable section. This is because in the general TCP, the congestion window is increased by one packet for each RTT, causing the throughput to be very slowly increased. This problem can be solved using the exemplary embodiment of the present invention.

The high-speed communication system has been described above. According to the above-described process, communication is performed without increasing the amount of data accumulated in the queue of the node, and thus communication can be performed at a high speed.

Further, according to the exemplary embodiments of the present invention, TCP connections before and after a node are different in speed from each other, and thus since an increase in the amount of data accumulated in the node can be reduced, communication can be performed at a high speed.

Further, according to the exemplary embodiments of the present invention, control is performed such that the degree of increase and decrease of the communication rate is made to the same at before and after a node, and thus, since an increase in the amount of data accumulated in the node can be reduced, communication can be performed at a high speed.

Further, according to the exemplary embodiments of the present invention, even when communication is suspended using a control signal, communication resumption is not delayed due to a transmission delay when communication resumes. Accordingly, a reduction in communication performance can be prevented.

The transmitting terminal, the relay node, and the receiving terminal include an internal computer system. A process of each processing described above is stored on a computer readable recording medium in the form of a program, and the above-described process is performed by reading and executing the program through a computer. Here, examples of the computer readable recording medium include a magnetic disk, an magneto-optical disc, a CD-ROM, a DVD-ROM, and a semiconductor memory.

The computer program may be distributed to a computer via a communication line, and the computer receiving it may execute the program.

Some of the above-described functions may be implemented by the program.

Further, the program may be a so-called differential file (a differential program) that can implement the above-described functions in combination with a program already recorded on a computer system.

The present invention has been described with reference to the exemplary embodiments, but the present invention is not limited to the above exemplary embodiments. A person having ordinary skill in the art can make various changes on the configuration or the details of the present invention within the scope of the present invention.

This application is based upon and claims the benefit of priority from Japanese patent application No. 2010-032872 filed on Feb. 17, 2010, the disclosure of which is incorporated herein in its entirety by reference.

INDUSTRIAL APPLICABILITY

The present invention can be applied to a high-speed communication system and a high-speed communication method, which are capable of transmitting data via a plurality of nodes. According to the high-speed communication system and the high-speed communication method, communication can be performed without increasing the amount of data accumulated in the queue of the node, and thus communication can be performed at a high speed.

DESCRIPTION OF REFERENCE SYMBOLS

101 Transmitting terminal
102 Receiving terminal
103, 104 Relay node
11, 21, 31 Input and output processing unit
12, 22, 32 IP processing unit
13, 34 TCP transmitting unit
23 TCP receiving unit
14, 24, 35 Application processing unit

The invention claimed is:

1. A high-speed communication system comprising:
a plurality of nodes disposed on a communication path; and
a plurality of communication connections established between the plurality of nodes,
the plurality of nodes exchanging a plurality of pieces of performance model information between the nodes, the plurality of pieces of performance model information representing communication performances achievable by each of the plurality of communication connections, and
each of the plurality of nodes executing communication control based on any one of the plurality of pieces of performance information,
wherein each of the plurality of nodes estimates an average throughput between the nodes included in the achievable communication performances, and
each of the plurality of nodes exchanges performance model information represented by the average throughput between the nodes, decides a target average throughput, and executes communication control based on the target average throughput.

2. A high-speed communication system comprising:
a plurality of nodes disposed on a communication path; and
a plurality of communication connections established between the plurality of nodes,
the plurality of nodes exchanging a plurality of pieces of performance model information between the nodes, the plurality of pieces of performance model information representing communication performances achievable by each of the plurality of communication connections, and
each of the plurality of nodes executing communication control based on any one of the plurality of pieces of performance model information,
wherein the plurality of pieces of performance model information represent at least one from among an average throughput between the nodes and a throughput increase speed between the nodes.

3. A high-speed communication system comprising:
a plurality of nodes disposed on a communication path; and
a plurality of communication connections established between the plurality of nodes,
the plurality of nodes exchanging a plurality of pieces of performance model information between the nodes, the plurality of pieces of performance model information representing communication performances achievable by each of the plurality of communication connections, and
each of the plurality of nodes executing communication control based on any one of the plurality of pieces of performance model information,
wherein each of the plurality of nodes estimates a throughput increase speed between the nodes included in the achievable communication performances, and
each of the plurality of nodes exchanges performance model information represented by the throughput increase speed between the nodes, decides a target throughput increase speed, and executes communication control based on the target throughput increase speed.

4. A high-speed communication system comprising:
a plurality of nodes disposed on a communication path; and
a plurality of communication connections established between the plurality of nodes,
the plurality of nodes exchanging a plurality of pieces of performance model information between the nodes, the plurality of pieces of performance model information representing communication performances achievable by each of the plurality of communication connections, and
each of the plurality of nodes executing communication control based on any one of the plurality of pieces of performance model information,
wherein the plurality of nodes include a start point node, an end point node, and a relay node disposed between the start point node and the end point node,
the start point node transmits to the end point node a control start signal announcing that communication is to be performed,
the end point node that has detected the control start signal calculates performance model information of the end point node based on detection of the control start signal, and the relay node calculates performance model information of the relay node based on the detection of the control start signal,
the start point node transmits a performance model notice signal storing the performance model information to the end point node,
the relay node compares the performance model information stored in the performance model notice signal with performance model information calculated by the relay node and transfers the performance model notice signal storing the performance model information representing a smaller value when the relay node transfers the performance model notice signal to the end point node,
the end point node stores the performance model information stored in the received performance model notice signal, and transmits a performance model decision signal storing the performance model information to the start point node,
the relay node that has relayed the performance model decision signal to the start point node and the start point node store the performance model information stored in the performance model decision signal, and
the start point node and the relay node perform TCP control based on the performance model information stored in the performance model decision signal.

5. The high-speed communication system according to claim 4,
wherein the start point node, the relay node, and the end point node include a preceding node and a subsequent node which are connected adjacent thereto,
the subsequent node transmits a communication suppression determination signal representing normal congestion window control to the preceding node in a case where an amount of data accumulated in a queue of the subsequent node is smaller than an amount of data of a constant times an amount of data when communication is performed at an average throughput between the preceding node and the subsequent node during a time of an RTT between the preceding node and the subsequent node, and
the preceding node performs TCP control based on the communication suppression determination signal.

6. The high-speed communication system according to claim 4,
wherein the start point node, the relay node, and the end point node include a preceding node and a subsequent node which are connected adjacent thereto,
the subsequent node transmits a communication suppression determination signal representing control of decreasing a congestion window to the preceding node in a case where an amount of data accumulated in a queue of the subsequent node is equal to or larger than an amount of data of a constant times an amount of data when communication is performed at an average throughput between the preceding node and the subsequent node during a time of an RTT between the preceding node and the subsequent node and is smaller than a constant which is an upper limit representing communication suspension, and
the preceding node performs TCP control based on the communication suppression determination signal.

7. The high-speed communication system according to claim 4,
wherein the start point node, the relay node, and the end point node include a preceding node and a subsequent node which are connected adjacent thereto,
the subsequent node transmits a communication suppression determination signal representing that data transmission is suspended by a time of an RTT between the subsequent node and the next node to the preceding node in a case where an amount of data accumulated in a queue of the subsequent node is larger than an upper limit representing communication suspension, and
the preceding node performs TCP control based on the communication suppression determination signal.

8. The high-speed communication system according to claim 4,
wherein the subsequent node transmits a communication suppression determination signal representing that data transmission is suspended by a time of an RTT between the subsequent node and a next node to the preceding node in a case where the subsequent node detects packet loss and the subsequent node performs control of decreasing a congestion window in TCP control on the next node, and
the preceding node performs TCP control based on the communication suppression determination signal.

9. The high-speed communication system according to claim 8, wherein the preceding node suspends communication by the time of the RTT between the subsequent node and the next node, decides a new congestion window size by multiplying a congestion window by a throughput decrease rate after the time of the RTT elapses, and resumes communication.

10. A high-speed communication method in a high-speed communication system performed via a plurality of nodes on a communication path including a start point node, an end point node, and a relay node disposed between the start point node and the end point node, the method comprising:
transmitting to the end point node a control start signal announcing that communication is to be performed, by the start point node;
calculating performance model information of the end point node based on detection of the control start signal, by the end point node that has detected the control start signal;
calculating performance model information of the relay node based on the detection of the control start signal, by the relay node;
transmitting a performance model notice signal storing the performance model information to the end point node, by the start point node;
comparing the performance model information stored in the performance model notice signal with performance model information calculated by the relay node and transferring the performance model notice signal storing only the performance model information representing a smaller value when the relay node transfers the performance model communication signal to the end point node;

storing the performance model information stored in the received performance model notice signal and transmitting a performance model decision signal storing the performance model information to the start point node, by the end point node;

storing the performance model information stored in the performance model decision signal, in the relay node that has relayed the performance model decision signal to the start point node and in the start point node; and performing TCP control based on the performance model information stored in the performance model decision signal, by the start point node and the relay node.

* * * * *

UNITED STATES PATENT AND TRADEMARK OFFICE
CERTIFICATE OF CORRECTION

PATENT NO. : 9,071,452 B2
APPLICATION NO. : 13/579508
DATED : June 30, 2015
INVENTOR(S) : Yohei Hasegawa and Masahiro Jibiki It is certified that error appears in the above-identified patent and that said Letters Patent is hereby corrected as shown below:

In the specification

Column 9, Line 42: Delete "13" and insert -- B --

In the claims

Column 14, Line 20: In Claim 1, after "performance" insert -- model --

Column 15, Line 12: In Claim 4, after "plurality" insert -- of --

Signed and Sealed this
Fifteenth Day of December, 2015

Michelle K. Lee
*Director of the United States Patent and Trademark Office*